United States Patent
Wiles (10) Patent No.: US 7,444,236 B2
(45) Date of Patent: Oct. 28, 2008

(54) DISCRETE VARIABLE VALVE LIFT DIAGNOSTIC CONTROL SYSTEM

(75) Inventor: Matthew A. Wiles, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 82 days.

(21) Appl. No.: 11/705,188

(22) Filed: Feb. 9, 2007

(65) Prior Publication Data

US 2008/0077307 A1   Mar. 27, 2008

Related U.S. Application Data

(60) Provisional application No. 60/847,225, filed on Sep. 26, 2006.

(51) Int. Cl.
G06F 19/00 (2006.01)
F01L 1/34 (2006.01)
G01M 15/00 (2006.01)

(52) U.S. Cl. ............... 701/114; 701/103; 701/111; 123/90.15; 73/114.79

(58) Field of Classification Search ......... 701/101–103, 701/111, 114; 123/90.15–90.18, 406.29, 123/406.37, 406.45; 73/35.01, 35.03, 114.77, 73/114.79

See application file for complete search history.

(56) References Cited

U.S. PATENT DOCUMENTS

| 6,769,404 B2 * | 8/2004 | Aoyama et al. | 123/406.29 |
| 7,063,057 B1 * | 6/2006 | Waters et al. | 123/90.16 |
| 7,146,851 B2 * | 12/2006 | Wakahara et al. | 73/114.79 |
| 7,387,018 B2 * | 6/2008 | Wiles | 73/114.39 |

FOREIGN PATENT DOCUMENTS

WO      WO 01/59281 A1 *  8/2001

* cited by examiner

Primary Examiner—Willis R Wolfe, Jr.

(57) ABSTRACT

A diagnostic control system for an internal combustion engine including a discrete variable valve lift (DVVL) system includes a first module that determines a knock threshold value based on engine operating parameters and an engine knock sensor that generates a knock signal. A second module monitors a portion of the knock signal that is associated with a particular cylinder of the engine, selectively identifies a fault of at least one valve of the DVVL system associated with the particular cylinder based on the portion and the knock threshold, and outputs a fault signal corresponding to the particular cylinder.

22 Claims, 6 Drawing Sheets

DISCRETE VARIABLE VALVE LIFT DIAGNOSTIC CONTROL SYSTEM

CROSS-REFERENCE TO RELATED APPLICATIONS

This application claims the benefit of U.S. Provisional Application No. 60/847,225, filed on Sep. 26, 2006. The disclosure of the above application is incorporated herein by reference.

FIELD

The present disclosure relates to vehicle diagnostic systems, and more particularly to a discrete variable valve lift (DVVL) diagnostic system that determines a valve lift malfunction in a DVVL engine system.

BACKGROUND

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating cam shaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift). Manufacturers usually incorporate a fixed valve lift schedule for an engine since it may be suitable for a range of operating conditions. However, the fixed valve lift schedule may not be optimal during a particular engine operating condition. For example, during highway travel a vehicle may experience minimal acceleration. During such a condition, the engine may require less air per cylinder. However, when the engine operates on a fixed valve lift schedule excess air may be pumped into the engine cylinders, resulting in pumping losses of the engine.

A discrete variable valve lift (DVVL) system enables the engine to operate on more than one valve lift schedule. More specifically, a DVVL engine system switches between different valve lift schedules based on the operating conditions of the engine. This has been shown to minimize pumping losses of the engine.

A malfunction of the DVVL system may occur when a cylinder experiences differential valve lift. More specifically, differential valve lift occurs when a set of intake and/or exhaust valves of a particular cylinder operate on different valve lift schedules. In other words, the intake and/or exhaust valves of the cylinder are not synchronized. For example, a malfunction may occur when the DVVL engine system is operating in a high lift (HL) mode and one of the cylinders has an intake valve operating in a low lift (LL) mode and the other intake valve is operating in high lift (HL) mode.

SUMMARY

Accordingly, the present disclosure provides a diagnostic control system for an internal combustion engine including a discrete variable valve lift (DVVL) system. The diagnostic control system includes a first module that determines a knock threshold value based on engine operating parameters and an engine knock sensor that generates a knock signal. A second module monitors a portion of the knock signal that is associated with a particular cylinder of the engine, selectively identifies a fault of at least one valve of the DVVL system associated with the particular cylinder based on the portion and the knock threshold, and outputs a fault signal corresponding to the particular cylinder.

In another feature, the diagnostic control system further includes a third module that selectively limits engine speed when the fault is identified.

In another feature, the second module identifies the fault when the knock signal is greater than the knock threshold.

In another feature, the second module identifies the fault when an average value of the knock signal over a plurality of engine cycles exceeds the knock threshold.

In another feature, the second module identifies the fault when the knock signal exceeds the knock threshold a threshold number of times within a particular number of engine cycles.

In still another feature, the operating parameters include at least one of an engine speed, a manifold absolute pressure and an ambient air temperature.

In yet another feature, the diagnostic control system further includes a third module that selectively initiates a valve operating mode of the DVVL system, wherein the fault indicates a differential valve lift condition of the DVVL system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the preferred embodiment(s) is merely exemplary in nature and is in no way intended to limit the disclosure, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

According to the present disclosure, a discrete variable valve lift (DVVL) diagnostic control system limits engine speed if a DVVL engine system is deemed to be malfunctioning. More specifically, a malfunction may occur when intake and/or exhaust valve operation is not synchronous. For example, a cylinder may include an intake valve operating in a low lift (LL) mode and another intake valve operating in a high lift (HL) mode. This may increase the propensity for knock in the particular cylinder. The DVVL diagnostic control system may determine non-synchronous valve operation based on increased knock.

Figure 1:
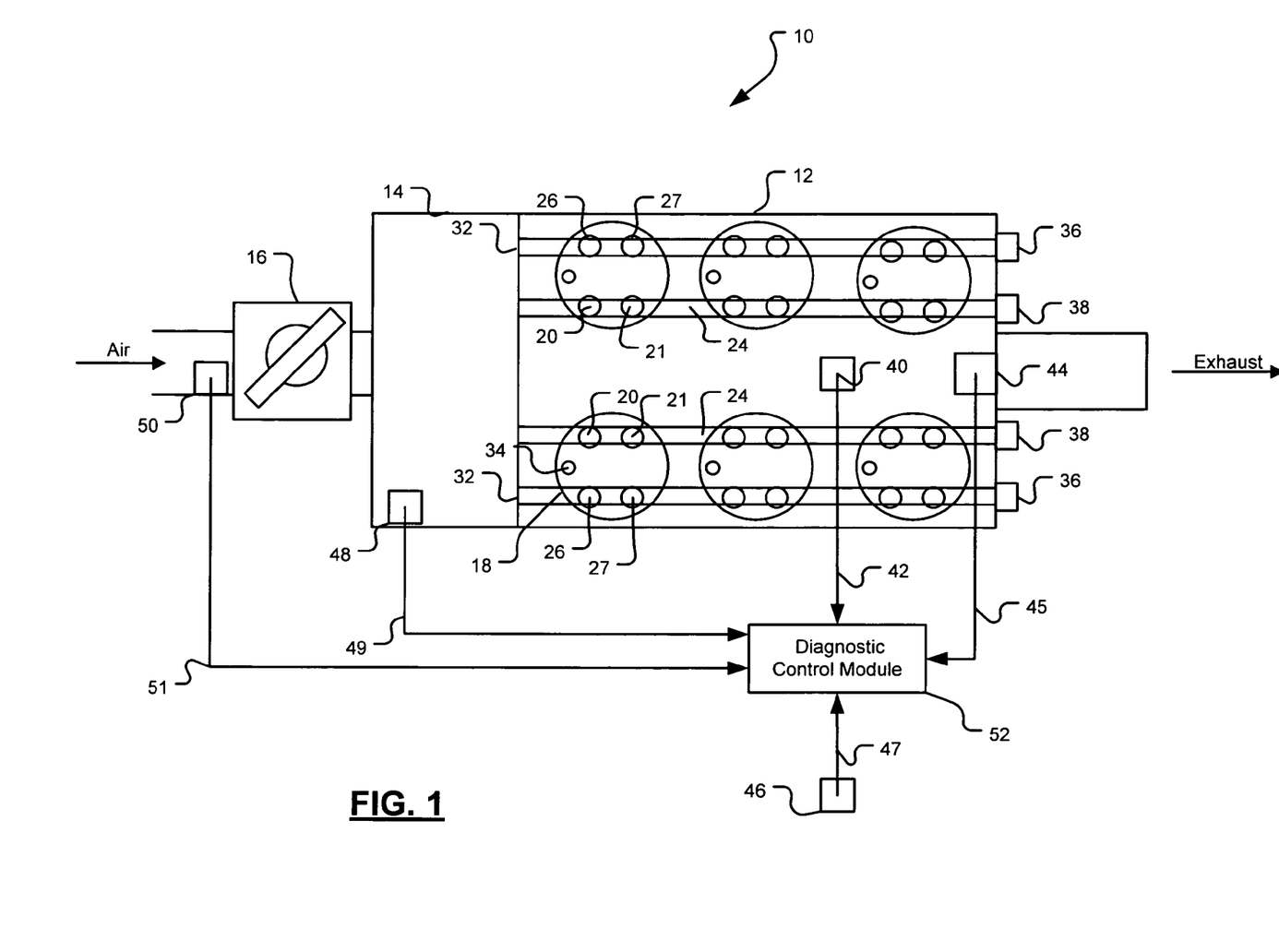
FIG. 1 is a functional block diagram of an exemplary six-cylinder engine including a discrete variable valve lift (DVVL) system according to the present disclosure.

Referring now to FIG. 1, a DVVL engine system 10 includes an engine 12 that combusts an air/fuel mixture to produce drive torque. Air is drawn into an intake manifold 14 through a throttle 16. The throttle 16 regulates air flow into the intake manifold 14. Air within the intake manifold 14 is distributed into cylinders 18. Although six cylinders are illustrated, it can be appreciated that the engine 12 may include additional or fewer cylinders 18. For example, engines having 2, 3, 4, 5, 8, 10 and 12 cylinders are contemplated. A fuel injector (not shown) injects fuel that is combined with air to provide a combustion mixture within the cylinder 18. A fuel injection system (not shown) regulates the fuel injector to provide a desired air-to-fuel ratio within each cylinder 18.

According to an exemplary embodiment of the present disclosure, the cylinder 18 includes two intake valves and two exhaust valves. First and second intake valves 20, 21 selectively open and close to enable the air/fuel mixture to enter the cylinder 18. The intake valve positions are regulated by intake cam shafts 24. First and second exhaust valves 26, 27 selectively open and close to enable the exhaust to exit the cylinder 18. The exhaust valve positions are regulated by exhaust cam shafts 32. Although two intake valves 20, 21 and two exhaust valves 26, 27 per cylinder 18 are shown, a single intake valve and a single exhaust valve per cylinder 18, or more than two intake valves and more than two exhaust valves per cylinder may be used in an alternate configuration of the cylinder 18.

A piston (not shown) compresses the air/fuel mixture within the cylinder 18. A spark plug 34 initiates combustion of the air/fuel mixture which drives the piston in the cylinder 18. The piston drives a crankshaft (not shown) to produce drive torque. The crankshaft rotatably drives camshafts 24, 32 using a timing chain (not shown) to regulate the timing of intake and exhaust valves 20, 21, 26, 27. Although dual intake camshafts and dual exhaust camshafts are shown, it is appreciated that a single intake camshaft and a single exhaust camshaft may be used in straight line cylinder configuration.

The engine 12 may include intake cam phasers 36 and exhaust cam phasers 38 that adjust the rotational timing of the intake and exhaust cam shafts 24, 32, respectively. More specifically, a phase angle of the intake and exhaust cam phasers 36, 38 may be retarded or advanced to adjust the rotational timing of the input and output camshafts 24, 32.

A knock sensor 40 detects engine knock and outputs a knock signal 42, which represents the mechanical vibration of the engine 12 in the form of a voltage. Engine knock is defined as an audible knocking sound caused by energy released due to auto-ignition. More specifically, auto-ignition is caused when pressure and/or temperature of the air-fuel mixture within the cylinder are high enough to prematurely induce combustion. According to the present disclosure, engine knock is deemed present when the knock signal 42 exceeds a predetermined threshold level. The threshold level may be an audible level that is measured in decibels.

An engine speed sensor 44 generates an engine speed signal 45 indicating the revolutions per minute (RPM) of the engine 12. An ambient temperature sensor 46 generates a temperature signal 47 indicating the air temperature. A manifold absolute pressure (MAP) sensor 48 generates a MAP signal 49 indicating the pressure within the intake manifold 14. A mass air flow (MAF) sensor 50 generates a MAF signal 51 indicating the amount of air that flows into the engine 12. A discrete variable valve lift (DVVL) diagnostic module 52 determines a valve operation malfunction in the DVVL engine system 10.

Figure 2:
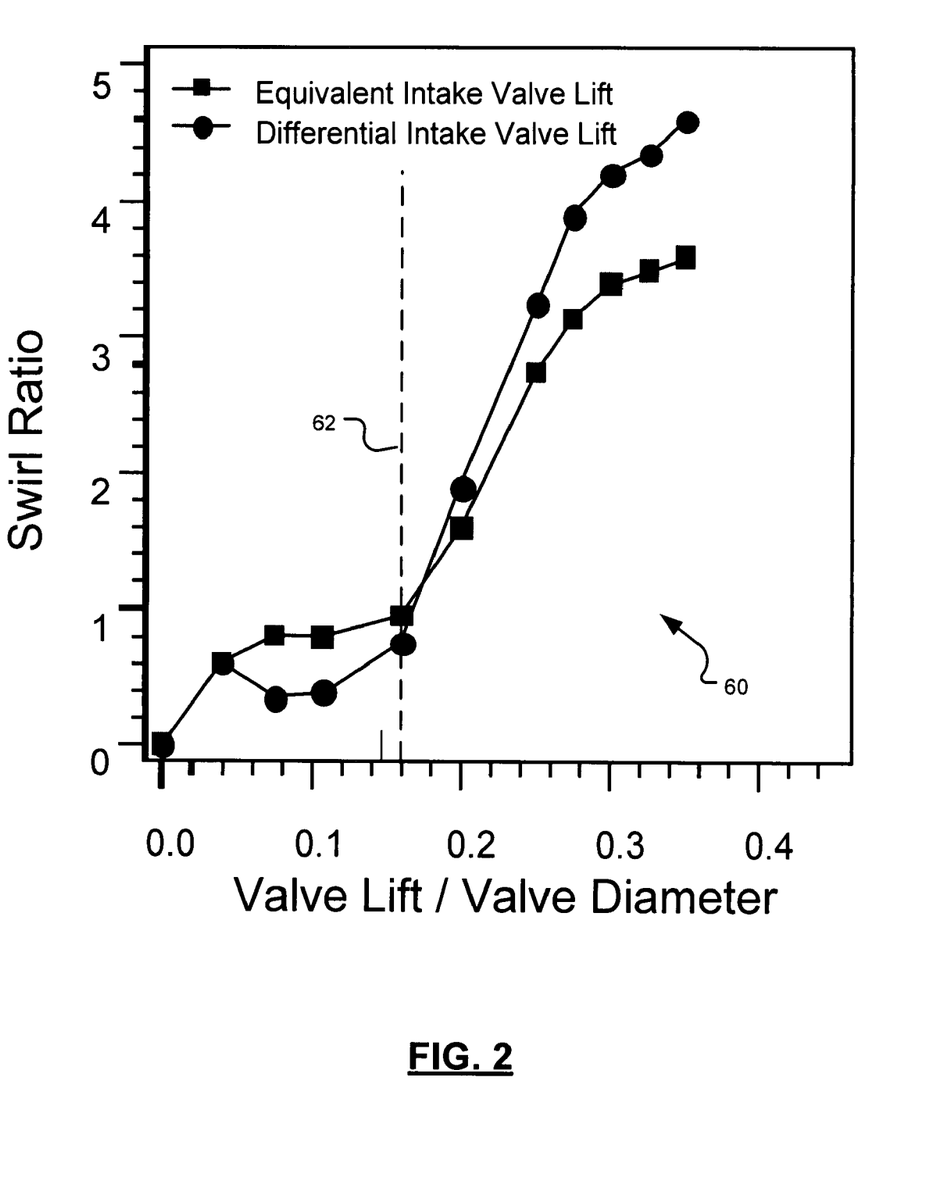
FIG. 2 illustrates a plot of air-fuel mixture motion of a cylinder with an equivalent intake valve lift and a cylinder with a differential intake valve lift.

Referring now to FIG. 2, a plot 60 illustrates the motion of the air-fuel mixture during an equivalent intake valve lift and during a differential intake valve lift within a cylinder. More specifically, the motion of the air-fuel mixture is provided in terms of a swirl ratio, which may be defined as the ratio between the angular momentum of the air-fuel mixture to the crankshaft's angular rotational speed. An equivalent valve lift occurs when both intake and/or exhaust valves within a cylinder operate in the same lift modes. A differential valve lift is when both intake and/or exhaust valves within a cylinder operate in different lift modes. For example, a differential valve lift condition exists when one of the cylinders 18 includes intake valve 20 operating in an HL mode and intake valve 21 is operating in an LL mode.

The plot 60 illustrates a greater swirl ratio for a differential valve lift condition versus an equivalent valve lift condition after approximately an exemplary 0.15 valve lift to valve diameter ratio represented by a dotted line 62. A greater swirl ratio results in increased temperature and pressure within the cylinder, which results in a greater propensity for engine knock. Since a cylinder with a differential valve lift has a higher swirl ratio than a cylinder with an equivalent valve lift, the cylinder with a differential valve lift will have a greater propensity for engine knock.

Figure 3A:
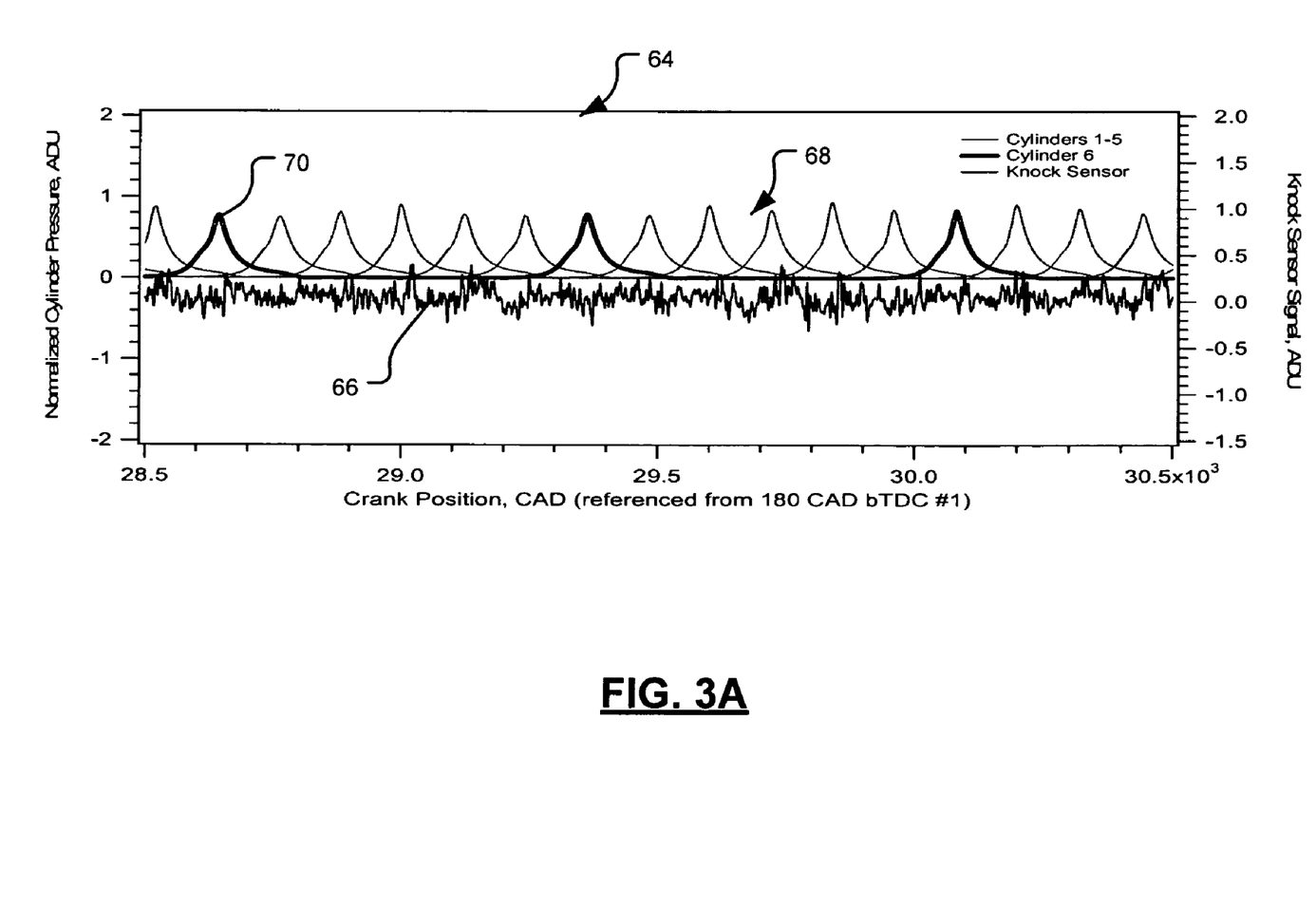
FIG. 3A illustrates a plot of normalized cylinder pressure versus crank angle of an exemplary six cylinder engine operating in a high lift (HL) mode and a corresponding knock signal.

Referring now to FIG. 3A, a graph 64 illustrates a normalized cylinder pressure trace of the exemplary six cylinder engine 12 in an HL mode and a corresponding knock signal 66. A plurality of pressure signals 68 are shown for the cylinders 18. A pressure signal 70, highlighted in bold, represents a particular cylinders 18 (e.g., cylinder #6 in the firing order). The knock signal 66 indicates small levels of background noise and/or small levels of knock activity. These small levels of knock activity do not create audible knock and occur during normal engine operating conditions.

Figure 3B:
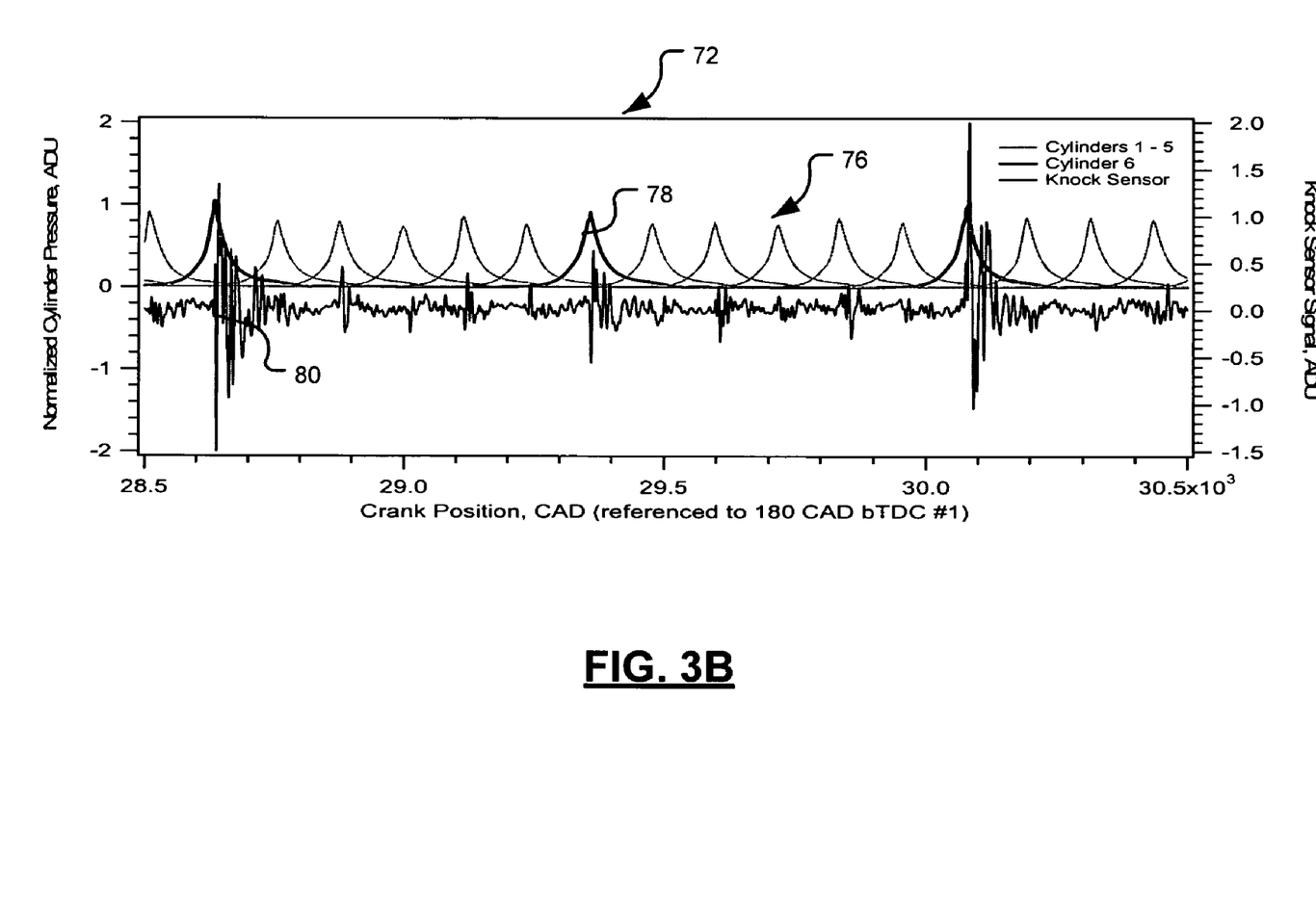
FIG. 3B illustrates a plot of normalized cylinder pressure versus crank angle of an exemplary six cylinder engine in an HL mode with one cylinder experiencing a differential intake valve lift and a corresponding knock signal.

Referring now to FIG. 3B, an exemplary graph 72 illustrates a normalized cylinder pressure trace of the engine 12 operating in the HL mode with one of the cylinders 18 operating with a differential intake valve lift. More specifically, one of the cylinders 18 includes the intake valve 20 operating in the HL mode and the intake valve 21 operating in the LL mode. A plurality of pressure signals 76 are shown for the cylinders 18. A pressure signal 78, highlighted in bold, represents a particular cylinder 18 (e.g., cylinder #6 in the firing order) with a differential intake valve lift. The pressure signal 78 has increased in magnitude as compared to the corresponding pressure signal 70 in FIG. 3A. This increase in magnitude is the result of the differential intake valve lift. A corresponding knock signal 80 indicates periodic engine knock activity in accordance with the cylinder experiencing differential valve lift. Although the plot 72 indicates that an increase in engine knock activity occurs when an LL failure exists during the HL mode, a similar increase in engine knock activity may be indicated when an HL failure exists during the LL mode.

Figure 4:
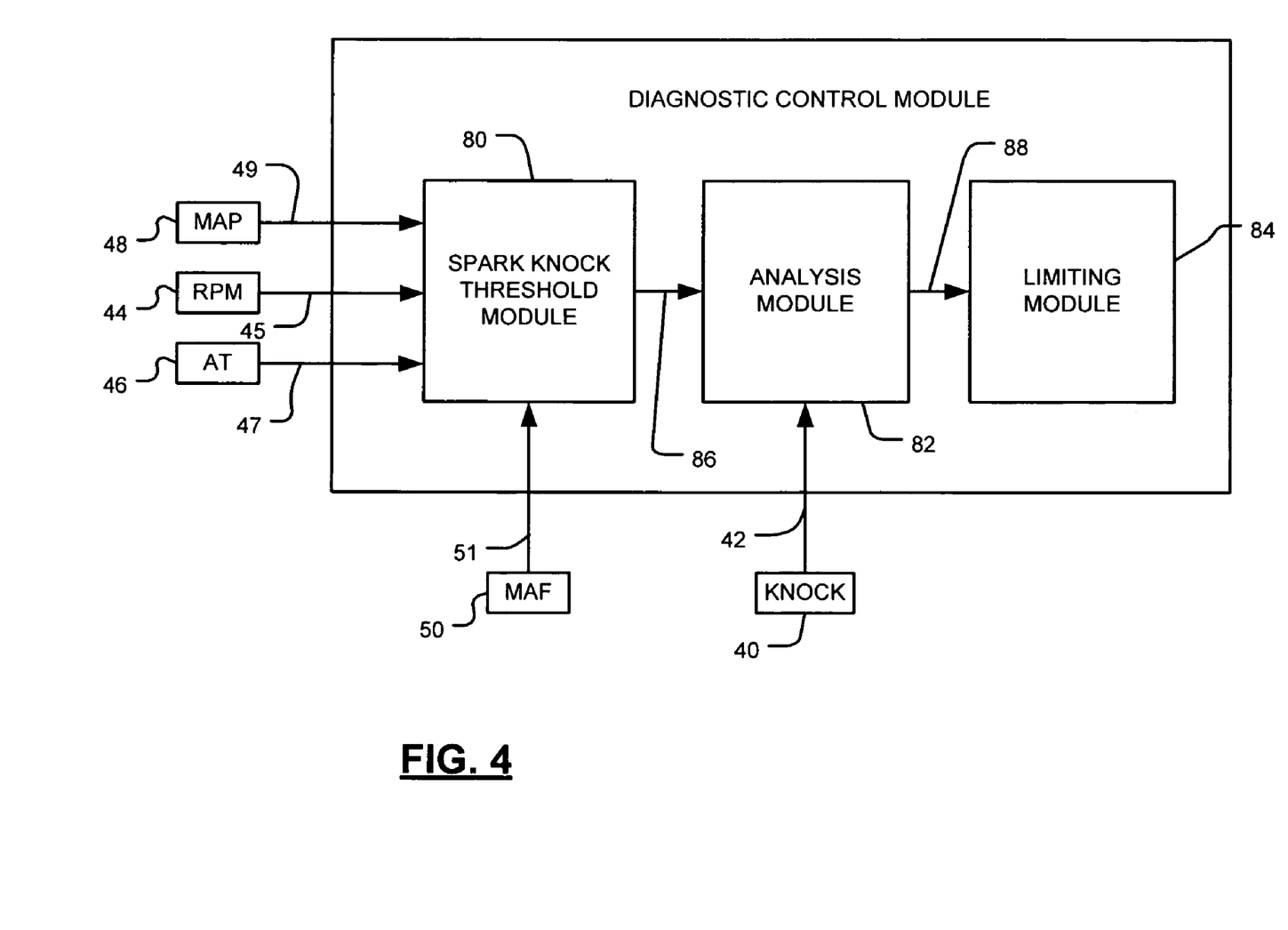
FIG. 4 is a functional block diagram of DVVL diagnostic control module according to the present disclosure.

Referring now to FIG. 4, the DVVL diagnostic module 52 includes an engine knock threshold module 80, an analysis module 82 and a limiting module 84. The engine knock threshold module 80 determines an engine knock threshold. More specifically, if the magnitude of the knock signal 42 is greater than the engine knock threshold, the engine 12 is experiencing engine knock. The engine knock threshold module 80 determines the engine knock threshold based on the environmental conditions and engine operating conditions. More specifically, the engine knock threshold module 80 determines the engine knock threshold based on, but is not limited to, an RPM signal 45, a MAP signal 49, an engine speed signal 45, an ambient temperature signal 47 and a MAF signal 51. The engine knock threshold module 80 outputs an engine knock threshold signal 86, which represents the engine knock threshold value.

The analysis module 82 analyzes the knock signal 42. More specifically, the analysis module 82 receives the engine knock threshold signal 86 and uses a engine knock detection algorithm to determine whether the knock signal 42 periodically exceeds the engine knock threshold value. When the knock signal 42 periodically exceeds the engine knock threshold value, it assures that the engine knock is due to a differential valve lift in one or more cylinders 18. Additionally, the engine knock detection algorithm may be able to determine the specific location of the engine knock. One such engine knock detection algorithm is disclosed in U.S. Pat. No. 6,649,924, which issued on Nov. 18, 2003 and is entitled Optoelectronic Measuring Device, the disclosure of which is incorporated herein by reference in its entirety. It is appreciated that other similar engine knock detection algorithms may be used. The analysis module 82 outputs a valve lift malfunction signal 88 when a periodic engine knock is detected. The limiting module 84 limits the engine speed when periodic engine knock is detected to prevent engine damage.

Figure 5:
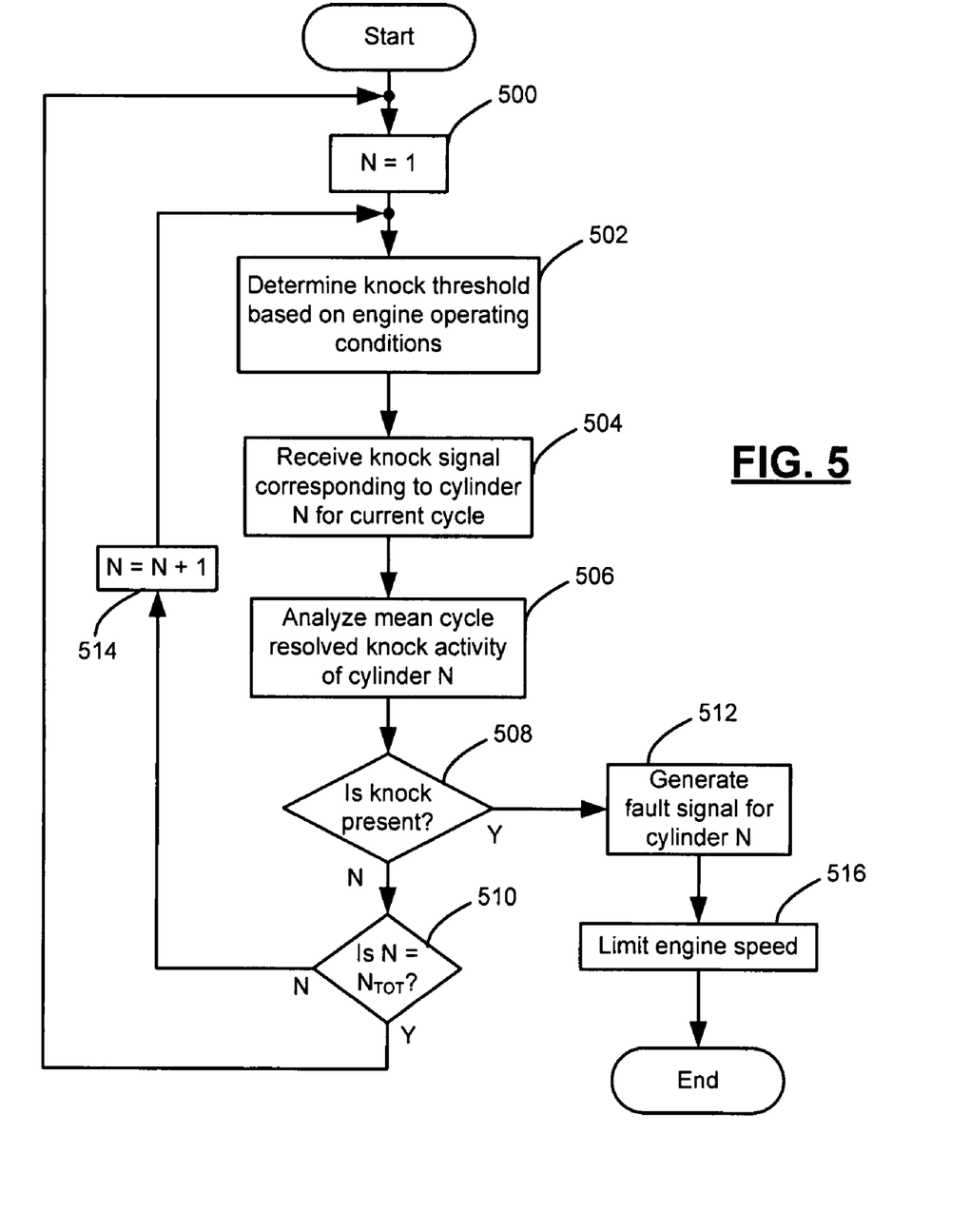
FIG. 5 is a flowchart illustrating exemplary steps executed to determine a valve lift malfunction for the DVVL engine system.

Referring now to FIG. 5, exemplary steps executed by the DVVL diagnostic control system will be described in detail. In step 500, control sets a variable N equal to 1. N is the current cylinder in the firing order that is being monitored. In step 502, control determines the knock threshold level based on engine operating conditions. In step 504, control receives the knock signal 42 corresponding to cylinder N. Control analyzes the mean cycle knock activity in step 506. More specifically, control analyzes the mean knock activity of the particular cylinder N over a plurality of past engine cycles and the current engine cycle.

In step 508, control determines whether knock is present, which corresponds to cylinder N. If knock is not present, control continues in step 510. If knock is present, control continues in step 512. In step 510, control determines whether N is equal to a total number of cylinders in the engine ($N_{TOT}$). If N is not equal to $N_{TOT}$, control increments N in step 514 and loops back to step 502. If N is equal to $N_{TOT}$, control loops back to step 500. In step 512, control generates a fault signal for cylinder N. In step 516, control limits the engine speed and control ends.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A diagnostic control system for an internal combustion engine including a discrete variable valve lift (DVVL) system, comprising:
   a first module that determines a knock threshold value based on engine operating parameters;
   an engine knock sensor that generates a knock signal; and
   a second module that monitors a portion of said knock signal that is associated with a particular cylinder of said engine, that selectively identifies a fault of at least one valve of said DVVL system associated with said particular cylinder based on said portion and said knock threshold and that outputs a fault signal corresponding to said particular cylinder.

2. The diagnostic control system of claim 1 further comprising a third module that selectively limits engine speed when said fault is identified.

3. The diagnostic control system in claim 1 wherein said second module identifies said fault when said knock signal is greater than said threshold.

4. The diagnostic control system of claim 1 wherein said second module identifies said fault when an average value of said knock signal over a plurality of engine cycles exceeds said knock threshold.

5. The diagnostic control system of claim 1 wherein said second module identifies said fault when said knock signal exceeds said knock threshold a threshold number of times within a particular number of engine cycles.

6. The diagnostic control system of claim 1 wherein said operating parameters include at least one of an engine speed, a manifold absolute pressure and an ambient air temperature.

7. The diagnostic control system of claim 1 further comprising a third module that selectively initiates a valve operating mode of said DVVL system, wherein said fault indicates a differential valve lift condition of said DVVL system.

8. A method of inhibiting improper operation of an internal combustion engine including a discrete variable valve lift (DVVL) system, comprising:
   determining a knock threshold value based on engine operating parameters;
   generating a knock signal using an engine knock sensor;
   monitoring a portion of said knock signal that is associated with a particular cylinder of said engine;
   selectively identifying a fault of at least one valve of said DVVL system associated with said particular cylinder based on said portion and said knock threshold; and
   outputting a fault signal corresponding to said particular cylinder.

9. The method of claim 8 further comprising a third module that selectively limits engine speed when said fault is identified.

10. The method in claim 8 further comprising identifying said fault when said knock signal is greater than said threshold.

11. The method of claim 8 further comprising identifying said fault when an average value of said knock signal over a plurality of engine cycles exceeds said knock threshold.

12. The method of claim 8 further comprising identifying said fault when said knock signal exceeds said knock threshold a threshold number of times within a particular number of engine cycles.

13. The method of claim 8 wherein said operating parameters include at least one of an engine speed, a manifold absolute pressure and an ambient air temperature.

14. The method of claim 8 further comprising selectively initiating a valve operating mode of said DVVL system, wherein said fault indicates a differential valve lift condition of said DVVL system.

15. A method of operating an internal combustion engine including a plurality of cylinders and a discrete variable valve lift (DVVL) system, comprising:
   initiating a valve operating mode of said DVVL system;
   generating a knock signal using an engine knock sensor;
   monitoring a plurality of portions of said knock signal, each of which correspond to a particular cylinder of said engine;
   selectively identifying a fault of at least one valve of said DVVL system associated with one of said plurality of cylinders based on said portion corresponding to said one of said plurality of cylinders; and
   outputting a fault signal corresponding to said one of said plurality of cylinders.

16. The method of claim 15 further comprising determining a knock threshold value based on engine operating parameters, wherein said fault signal is based on a comparison of said knock signal and said knock threshold value.

17. The method of claim 16 wherein said operating parameters include at least one of an engine speed, a manifold absolute pressure and an ambient air temperature.

18. The method of claim 15 further comprising a selectively limiting engine speed when said fault is identified.

19. The method in claim 15 further comprising identifying said fault when said knock signal is greater than a threshold.

20. The method of claim 15 further comprising identifying said fault when an average value of said knock signal over a plurality of engine cycles exceeds a threshold.

21. The method of claim 15 further comprising identifying said fault when said knock signal exceeds a knock threshold a threshold number of times within a particular number of engine cycles.

22. The method of claim 15 wherein said fault indicates a differential valve lift condition of said DVVL system.

* * * * *